United States Patent
Lee et al.

(10) Patent No.: US 12,548,322 B2
(45) Date of Patent: Feb. 10, 2026

(54) ELECTRONIC APPARATUS AND METHOD FOR IDENTIFYING CONTENT

(71) Applicant: Samsung Electronics Co., Ltd., Suwon-si (KR)

(72) Inventors: Kookyeon Lee, Suwon-si (KR); Sangbeom Nam, Suwon-si (KR); Jaemyeon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 155 days.

(21) Appl. No.: 18/607,842

(22) Filed: Mar. 18, 2024

(65) Prior Publication Data
US 2024/0221378 A1 Jul. 4, 2024

Related U.S. Application Data

(63) Continuation of application No. PCT/KR2022/012732, filed on Aug. 25, 2022.

(30) Foreign Application Priority Data

Oct. 18, 2021 (KR) .................. 10-2021-0138823
Nov. 10, 2021 (KR) .................. 10-2021-0154324

(51) Int. Cl.
*G06V 20/20* (2022.01)
*G06T 7/00* (2017.01)
(Continued)

(52) U.S. Cl.
CPC ............ *G06V 20/20* (2022.01); *G06T 7/0002* (2013.01); *G06T 7/11* (2017.01); *G06T 7/74* (2017.01);
(Continued)

(58) Field of Classification Search
CPC ...... G06V 20/20; G06V 10/40; G06T 7/0002; G06T 7/11; G06T 7/74; G06T 2207/30244; G06T 19/006; G06T 7/73
See application file for complete search history.

(56) References Cited

U.S. PATENT DOCUMENTS 9,799,139 B2   10/2017   Sievert et al.
10,038,887 B2   7/2018   Galllup et al.
(Continued)

FOREIGN PATENT DOCUMENTS

CN   111985357 A   11/2020
CN   112489121 A   3/2021
(Continued)

OTHER PUBLICATIONS

Chen Yujin et al., Indoor Visual Positioning Aided by CNN-Based Image Retrieval: Training-Free, 3D Modeling-Free, Sensors, XP055820968, Aug. 16, 2018.
(Continued)

*Primary Examiner* — Grace Q Li
(74) *Attorney, Agent, or Firm* — Jefferson IP Law, LLP

(57) ABSTRACT

An electronic device includes a camera, a communication circuit, memory storing one or more computer programs, and at least one processor. The one or more computer programs include computer-executable instructions that, when executed by the one or more processors, cause the electronic device to obtain information on a second image comprising a plurality of visual objects and changed from a first image, transmit, to a server, the information on the second image, receive information on a three-dimensional (3D) model for a space comprising the plurality of external objects and information on a reference image, obtain a third image by removing, from the second image, at least one visual object among the plurality of visual objects, identify at least one feature point based on a comparison between the
(Continued)

reference image and the third image, identify a pose of a virtual camera, and identify content superimposed on the first image.

20 Claims, 13 Drawing Sheets

(51) Int. Cl.
    *G06T 7/11*     (2017.01)
    *G06T 7/73*     (2017.01)
    *G06V 10/40*     (2022.01)

(52) U.S. Cl.
    CPC .... *G06V 10/40* (2022.01); *G06T 2207/30184* (2013.01); *G06T 2207/30244* (2013.01)

(56) References Cited

U.S. PATENT DOCUMENTS

| | | | |
|---|---|---|---|
| 10,733,475 | B2 | 8/2020 | Holzer et al. |
| 10,970,874 | B2 | 4/2021 | Bang |
| 2015/0371440 | A1 | 12/2015 | Pirchheim et al. |
| 2019/0080467 | A1 | 3/2019 | Hirzer et al. |
| 2020/0265231 | A1 | 8/2020 | Li et al. |
| 2021/0090285 | A1 | 3/2021 | Sagong et al. |
| 2021/0118112 | A1 | 4/2021 | Huang et al. |
| 2021/0174124 | A1 | 6/2021 | Lin et al. |
| 2022/0277476 | A1* | 9/2022 | Sagong .................. G06F 3/011 |
| 2022/0335649 | A1* | 10/2022 | Nayak ...................... G06T 7/74 |

FOREIGN PATENT DOCUMENTS

| | | | |
|---|---|---|---|
| JP | 5764390 | B2 | 8/2015 |
| JP | 2020535509 | A | 12/2020 |
| KR | 10-0327120 | B1 | 3/2002 |
| KR | 10-2019-0127838 | A | 11/2019 |
| KR | 10-2021-0034253 | A | 3/2021 |
| KR | 10-2021-0041039 | A | 4/2021 |
| KR | 10-2021-0050997 | A | 5/2021 |
| KR | 10-2557049 | B1 | 7/2023 |
| WO | 2015/142446 | A1 | 9/2015 |

OTHER PUBLICATIONS

Mousavian Arsalan et al., Semantically Guided Location Recognition for Outdoors Scenes, 2015 IEEE International Conference on Robotics and Automation (ICRA), XP033169091, May 26, 2015.
European Search Report dated Feb. 7, 2025, issued in European Application No. 22883752.2.
International Search Report and Written Opinion dated Dec. 7, 2022, issued in International Application No. PCT/KR2022/012732.

* cited by examiner

ELECTRONIC APPARATUS AND METHOD FOR IDENTIFYING CONTENT

CROSS-REFERENCE TO RELATED APPLICATION(S)

This application is a continuation application, claiming priority under § 365(c), of an International application No. PCT/KR2022/012732, filed on Aug. 25, 2022, which is based on and claims the benefit of a Korean patent application number 10-2021-0138823, filed on Oct. 18, 2021, in the Korean Intellectual Property Office, and of a Korean patent application number 10-2021-0154324, filed on Nov. 10, 2021, in the Korean Intellectual Property Office, the disclosure of each of which is incorporated by reference herein in its entirety.

BACKGROUND

1. Field

The disclosure relates to an electronic apparatus and a method for identifying an electronic device.

2. Description of Related Art

Recently, a service that provides information on an object to a user in a form of augmented reality (AR) is attracting attention. In this regard, various technologies for recognizing various objects in an urban environment are being proposed. Since a building in the urban environment is the most existing object, research is underway to increase a recognition rate for building recognition.

The above information is presented as background information only to assist with an understanding of the disclosure. No determination has been made, and no assertion is made, as to whether any of the above might be applicable as prior art with regard to the disclosure.

SUMMARY

An electronic device may provide AR content after recognizing buildings located in an external environment. As a distance between buildings located in the external environment and the electronic device increases, a recognition rate for buildings in the electronic device may decrease. In addition, due to other external objects (e.g., a car, a person, and/or a tree) other than the building, the recognition rate for buildings may decrease. In case that the recognition rate for buildings in the electronic device is decreased, a location or a pose of the electronic device may be incorrectly determined, and inaccurate AR content may be provided. Thus, a method for improving an accuracy of a location of the AR content provided by the electronic device or an accuracy of a shape of the AR content may be required.

Aspects of the disclosure are to address at least the above-mentioned problems and/or disadvantages and to provide at least the advantages described below. Accordingly, an aspect of the disclosure is to provide an electronic apparatus and method for identifying content.

Additional aspects will be set forth in part in the description which follows and, in part, will be apparent from the description, or may be learned by practice to the presented embodiments.

In accordance with an aspect of the disclosure, an electronic device is provided. The electronic device includes a camera, a communication circuit, memory storing one or more computer programs, and at least one processor communicatively coupled to the camera, the communication circuit, and the memory, wherein the one or more computer programs include computer-executable instructions that, when executed by the one or more processors, cause the electronic device to obtain information on a second image comprising a plurality of visual objects corresponding to a plurality of external objects respectively and changed from a first image obtained using the camera, transmit, to a server, the information on the second image, receive information on a three-dimensional (3D) model for a space comprising the plurality of external objects and information on a reference image identified based on the information on the second image transmitted to the server, in response to receiving the information on the reference image, obtain a third image by removing, from the second image, at least one visual object comprised in the second image of the second image and the reference image, among the plurality of visual objects, identify at least one feature point among a plurality of feature points identified based on a comparison between the reference image and the third image, identify, based on the at least one feature point, a pose of a virtual camera, and identify a content superimposed on the first image by processing 3D model based on the pose of the virtual camera.

In accordance with another aspect of the disclosure, a method of an electronic device is provided. The method includes obtaining information on a second image including a plurality of visual objects corresponding to a plurality of external objects respectively and changed from a first image obtained using a camera, transmitting, to a server, the information on the second image, receiving information on a three-dimensional (3D) model for a space comprising the plurality of external objects and information on a reference image identified based on the information on the second image transmitted to the server, in response to receiving the information on the reference image, obtaining a third image by removing, from the second image, at least one visual object includes in the second image of the second image and the reference image, among the plurality of visual objects, identifying at least one feature point among a plurality of feature points identified based on comparison between the reference image and the third image, identifying, based on the at least one feature point, a pose of a virtual camera, and identifying a content superimposed on the first image by processing 3D model based on the pose of the virtual camera.

In accordance with another aspect of the disclosure, one or more non-transitory computer readable storage media storing one or more programs including computer-executable instructions that, when being executed by one or more processors of an electronic device including a camera and a communication circuit, cause the electronic device to perform operations are provided. The operations include obtaining information on a second image comprising a plurality of visual objects corresponding to a plurality of external objects respectively and changed from a first image obtained using the camera, transmitting, to a server, the information on the second image, receiving information on a three-dimensional (3D) model for a space comprising the plurality of external objects and information on a reference image identified based on the information on the second image transmitted to the server, in response to receiving the information on the reference image, obtaining a third image by removing, from the second image, at least one visual object comprised in the second image of the second image and the reference image, among the plurality of visual objects, identifying at least one feature point among a plurality of feature points identified based on a comparison between the reference image and the third image, identifying, based on the at least one feature point, a pose of a virtual camera, and identifying a content superimposed on the first image by processing a 3D model based on the pose of the virtual camera.

An electronic device according to an embodiment can convert a first image obtained through a camera into a second image. The electronic device can transmit information on the second image to a server. The electronic device can receive a reference image and can convert the second image into a third image based on the reference image. The electronic device can identify rotation errors and can identify a pose of a virtual camera based on comparison with the third image and the reference image. By calibrating the rotation errors, there is an effect of capable of identifying an accurate pose of the virtual camera. In addition, by identifying the accurate pose of the virtual camera, there is an effect of capable of identifying an accurate pose of the electronic device.

Other aspects, advantages, and salient features of the disclosure will become apparent to those skilled in the art from the following detailed description, which, taken in conjunction with the annexed drawings, discloses various embodiments to the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an integrated circuit (IC), or the like.

Figure 1:
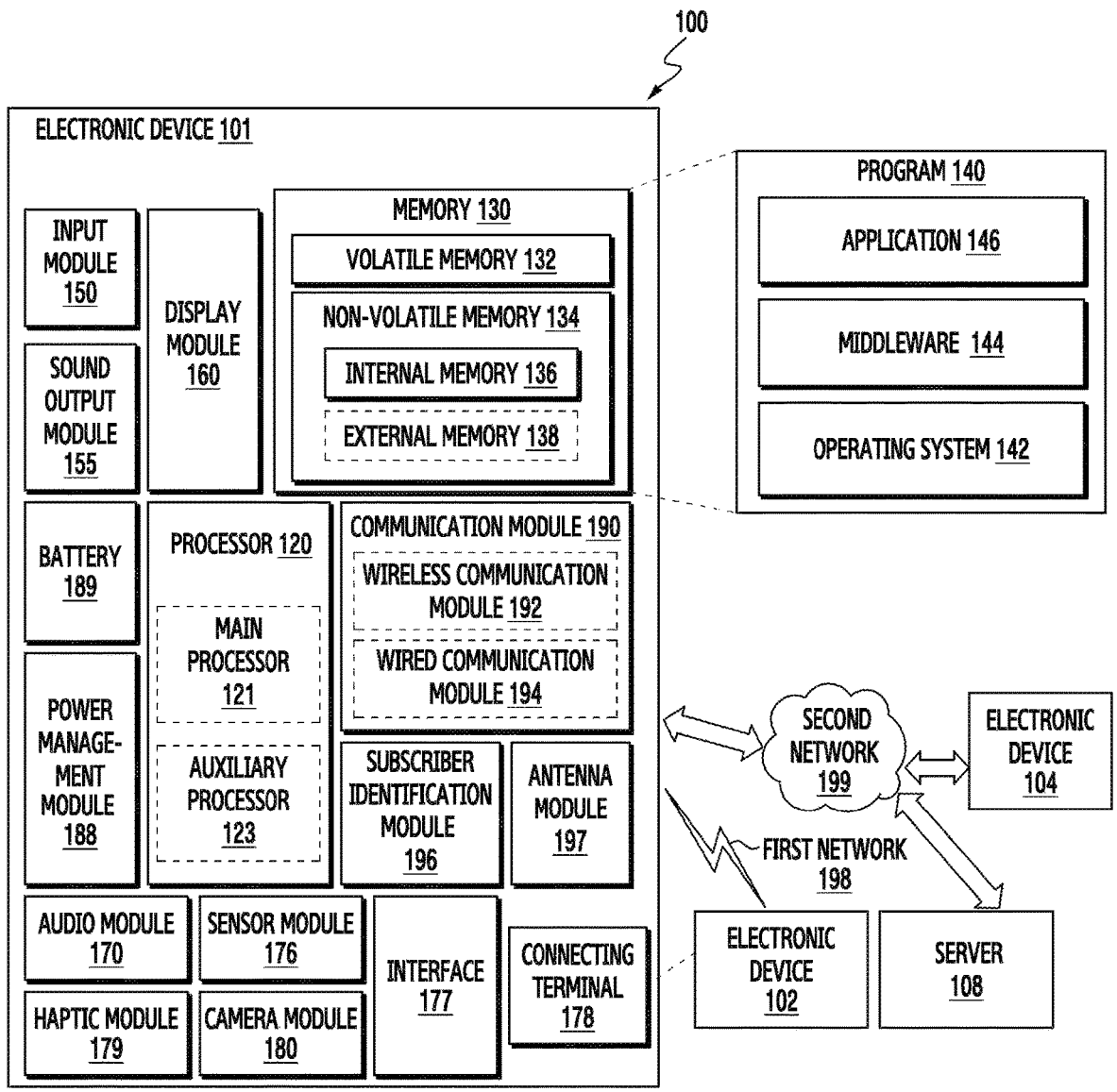
FIG. 1 is a block diagram of an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 decibels (dB) or less) for implementing mMTC, or U-plane latency (e.g., 0.5 milliseconds (ms) or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

According to an embodiment, a processor (e.g., a processor 120 of FIG. 1) of an electronic device (e.g., an electronic device 101 of FIG. 1) may obtain an image through a camera. The processor may transmit information on an image converted from the obtained image to a server in order to display content superimposing on the obtained image. The processor may receive information on a 3D model and information for identifying a pose of the electronic device from the server. The processor may identify a pose of a virtual camera through the identified pose. By processing the 3D model based on the pose of the virtual camera, the processor may identify content (e.g., an AR object) to be displayed superimposing on the obtained image.

An operation of the electronic device (or the processor of the electronic device) for the above-described embodiment may be described below. The electronic device described below may correspond at least in part to the electronic device 101 of FIG. 1. The server described below may correspond at least in part to the server 108 of FIG. 1.

Figure 2:
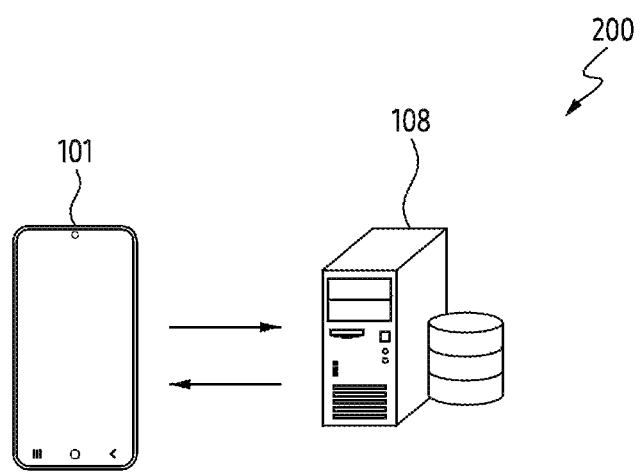
FIG. 2 illustrates an environment including an electronic device and a server according to an embodiment of the disclosure.

FIG. 2 illustrates an environment including an electronic device and a server according to an embodiment of the disclosure.

Referring to FIG. 2, in a network environment 200, an electronic device 101 and a server 108 may be used to identify content to be displayed superimposed on an image obtained through a camera in the electronic device 101.

According to an embodiment, the electronic device 101 may identify (or scan) surroundings of a user of the electronic device 101 through the camera. The electronic device 101 may identify a location of the electronic device 101 through a global positioning system (GPS) receiver (e.g., a wireless communication module 192 of FIG. 1). The electronic device 101 may identify a first image through the camera at the identified location. The electronic device 101 may convert the first image into a second image. The electronic device 101 may transmit information on the converted second image to the server 108.

The server 108 may receive information on the second image from the electronic device 101. The server 108 may identify a reference image corresponding to the second image among a plurality of images in memory (or a database). For example, the server 108 may identify an image most similar to the second image among the plurality of images as the reference image. The server 108 may identify data on a pose of the electronic device 101 based on the reference image. The server 108 may transmit the data on the pose of the electronic device 101 to the electronic device 101. In addition, the server 108 may transmit information on a 3D model to the electronic device 101.

The electronic device 101 may receive the data on the pose of the electronic device 101 and the information on the three-dimensional (3D) model. The electronic device 101 may identify the pose of the electronic device 101 based on the data on the pose of the electronic device 101 received from the server 108. The electronic device 101 may identify a pose of a virtual camera based on the pose of the electronic device 101. The electronic device 101 may process the 3D model based on the pose of the virtual camera. The electronic device 101 may identify content superimposed on the first image by processing the 3D model.

Figure 3:
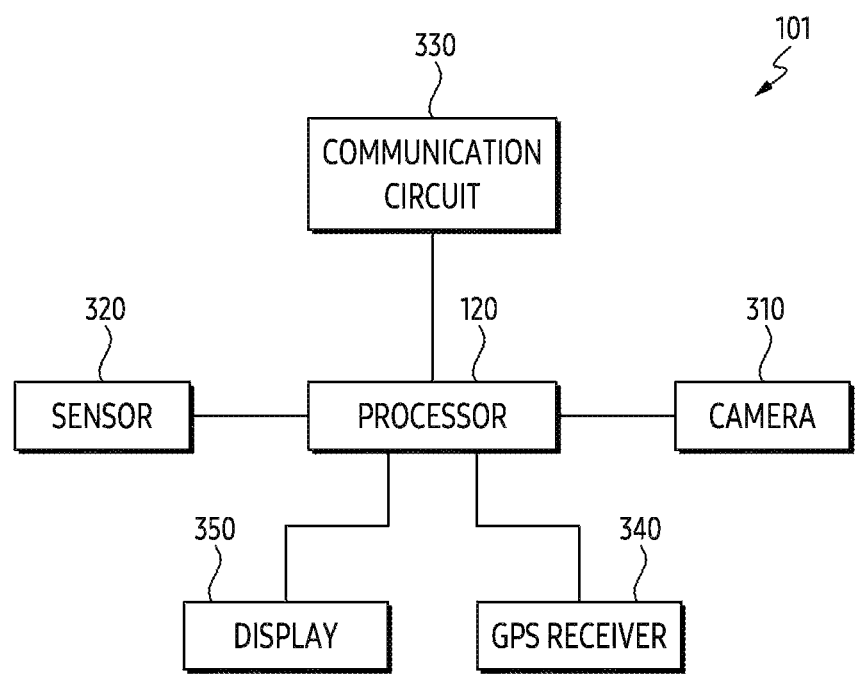
FIG. 3 is a simplified block diagram of an electronic device according to an embodiment of the disclosure.

FIG. 3 is a simplified block diagram of an electronic device according to an embodiment of the disclosure.

Referring to FIG. 3, an electronic device 101 of FIG. 3 may correspond at least in part to the electronic device 101 of FIG. 2. The electronic device 101 may include a processor 120, a camera 310, a sensor 320, a communication circuit 330, a GPS receiver 340, and/or a display 350. According to an embodiment, the electronic device 101 may include at least one of the processor 120, the camera 310, the sensor 320, the communication circuit 330, the GPS receiver 340, and the display 350. For example, at least some of the processor 120, the camera 310, the sensor 320, the communication circuit 330, the GPS receiver 340, and the display 350 may be omitted according to an embodiment.

According to an embodiment, the processor 120 may correspond at least in part to the processor 120 of FIG. 1. The processor 120 may be operatively or operably coupled with or connected with the camera 310, the sensor 320, the communication circuit 330, the GPS receiver 340, and the display 350. The processor 120 may be configured with at least one processor. For example, the processor 120 may include the at least one processor.

According to an embodiment, the processor 120 may include a hardware component for processing data based on one or more instructions. The hardware component for processing data may include, for example, an arithmetic and logic unit (ALU), a field programmable gate array (FPGA), and/or a central processing unit (CPU).

According to an embodiment, the camera 310 may include one or more optical sensors (e.g., a Charged Coupled Device (CCD) sensor, a Complementary Metal Oxide Semiconductor (CMOS) sensor) that generates an electrical signal indicating a color and/or brightness of light. A plurality of optical sensors included in the camera 310 may be disposed in a form of a 2 dimensional array. The camera 310 may generate an image that corresponds to light reaching the optical sensors of the 2 dimensional array and includes a plurality of pixels arranged in two dimensions, by obtaining an electrical signal of each of the plurality of optical sensors substantially simultaneously. For example, photo data (and/or photo) captured using the camera 310 may mean one image obtained from the camera 310. For example, video data captured using the camera 310 may mean a sequence of a plurality of images obtained from the camera 310 according to a designated frame rate. For example, the camera 310 may correspond at least in part to camera module 180 of FIG. 1.

According to an embodiment, the electronic device 101 may be disposed toward a direction in which the camera 310 receives light and may further include a flash light for outputting light in the direction.

According to an embodiment, the electronic device 101 may include the sensor 320. For example, the sensor 320 may correspond at least in part to sensor module 176 of FIG. 1. The sensor 320 may be used to identify information on a location of the electronic device 101 or information on movement (or pose) of the electronic device 101. The sensor 320 may be configured with at least one sensor. For example, the sensor 320 may include the at least one sensor. For example, the sensor 320 may include an acceleration sensor, a gyro sensor, or a magnetometer. The acceleration sensor may identify (or measure or detect) acceleration of the electronic device 101 in three directions of an x-axis, a y-axis, and a z-axis. The gyro sensor may identify (or measure or detect) an angular velocity of the electronic device 101 in the three directions of the x-axis, the y-axis, and the z-axis. The magnetometer may detect magnitude of a magnetic field.

According to an embodiment, the electronic device 101 may include the communication circuit 330. For example, the communication circuit 330 may correspond at least in part to communication module 190 of FIG. 1. For example, the communication circuit 330 may be used for various radio access technologies (RATs). For example, the communication circuit 330 may include at least one communication circuit. For example, the communication circuit 330 may be configured with the at least one communication circuit. As an example, the communication circuit 330 may include a communication circuit for cellular communication and/or a communication circuit for wireless LAN communication.

For example, the processor 120 may communicate with a server (e.g., a server 108 of FIG. 2) through the communication circuit 330. The processor 120 may transmit information on an image to the server through the communication circuit 330. Alternatively, the processor 120 may receive the information on the location of the electronic device 101 or information on a 3D model from the server through the communication circuit 330.

According to an embodiment, the electronic device 101 may include the GPS receiver 340. The GPS receiver 340 may correspond at least in part to a GNSS communication module, which is an example of the wireless communication module 192 of FIG. 1. The GPS receiver 340 may be used to receive a GPS signal. The electronic device 101 may alternatively or additionally include a receiver for receiving a signal of at least one (e.g., a Beidou navigation satellite system, quasi-zenith satellite system (QZSS), an Indian regional satellite system (IRNSS), and the European global satellite-based navigation system (Galileo)) of a global navigation satellite system (GNSS) according to at least one of a use area or bandwidth, and may receive the information on the location of the electronic device 101 based thereon. The processor 120 may receive (or obtain) the information on the location of the electronic device 101 using the GPS receiver 340.

According to an embodiment, the electronic device 101 may include the display 350. For example, the display 350 may correspond at least in part to display module 160 of FIG. 1. The display 350 may be used to display various screens. For example, the display 350 may be used to output content, data, or a signal through the screen. The display 350 may output visualized information to a user. The visualized information may be generated by an application (e.g., an application 146 of FIG. 1). For example, the display 350 may output the visualized information to the user by being controlled by a controller such as a graphic processing unit (GPU) included in the processor 120 or disposed independently of the processor 120 in the electronic device 101. The display 350 may include a flat panel display (FPD) and/or an electronic paper. The FPD may include a liquid crystal display (LCD), a plasma display panel (PDP), and/or one or more light emitting diodes (LEDs). The LED may include an organic LED (OLED).

For example, the display 350 may be used to display the image obtained (or identified) through the camera 310. The processor 120 may obtain an image including a visual object corresponding to at least one external object (or at least a portion of the at least one external object) through the camera 310. The processor 120 may display an image obtained through the display 350.

Although not illustrated, the electronic device 101 may further include memory. According to an embodiment, the memory may be used to store information or data. For example, the memory may correspond at least in part to memory 130 of FIG. 1. For example, the memory may be used to store data obtained (or received) from the server (e.g., the server 108 of FIG. 2). For example, the memory may be a volatile memory unit or units. For example, the memory may be a non-volatile memory unit or units. For another example, the memory may be another form of computer-readable medium, such as a magnetic or optical disk.

According to an embodiment, one or more instructions indicating an operation to be performed by the processor 120 may be stored in the memory. Hereinafter, a set of the one or more instructions is referred to as firmware, operating system, process, routine, sub-routine and/or application. For example, the processor 120 may operate by executing a set of a plurality of instructions distributed in a form of the application.

According to an embodiment, the memory may be used to store various applications. For example, the memory may be used to store an application for providing a service to the user based on a location.

Figure 4:
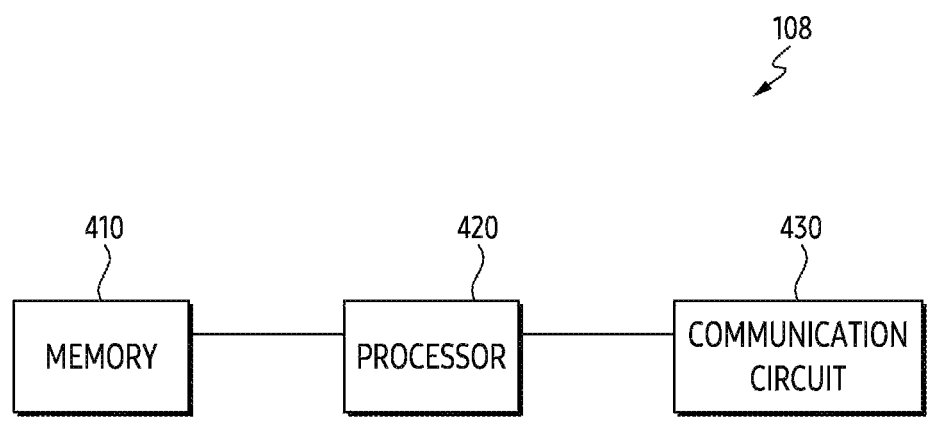
FIG. 4 is a simplified block diagram of a server according to an embodiment of the disclosure.

FIG. 4 is a simplified block diagram of a server according to an embodiment of the disclosure.

Referring to FIG. 4, a server 108 of FIG. 4 may correspond at least in part to the server 108 of FIG. 2. The server 108 may include memory 410, a processor 420, and/or a communication circuit 430. According to an embodiment, the server 108 may include at least one of the memory 410, the processor 420, and the communication circuit 430. For example, at least a portion of the memory 410, the processor 420, and the communication circuit 430 may be omitted according to an embodiment.

According to an embodiment, the processor 420 may correspond at least in part to a processor 120 of FIG. 1. The processor 420 may be operatively or operably coupled with or connected with the memory 410 and the communication circuit 430.

According to an embodiment, the server 108 may include the memory 410. The memory 410 may store a database. For example, the memory 410 may correspond at least in part to memory 130 of FIG. 1.

According to an embodiment, the memory 410 may be used to store a plurality of images of an external environment. For example, the memory 410 may store a plurality of images photographed while a device including a plurality of cameras and a GPS circuit drives on a road. For another example, the memory 410 may store a plurality of building images generated by or a database of a public building or processing a plurality of images photographed through a satellite. For another example, the memory 410 may store information on a 3D model at a specific location in the external environment.

According to an embodiment, the server 108 may include the communication circuit 430. For example, a communication circuit 330 may correspond at least in part to communication module 190 of FIG. 1. For example, the processor 420 may communicate with at least one electronic device (e.g., an electronic device 101 of FIG. 2) through the communication circuit 430. The processor 420 may receive information on an image from the at least one electronic device through the communication circuit 430. For example, the processor 420 may transmit information on a location of the at least one electronic device or the information on the 3D model.

Figure 5:
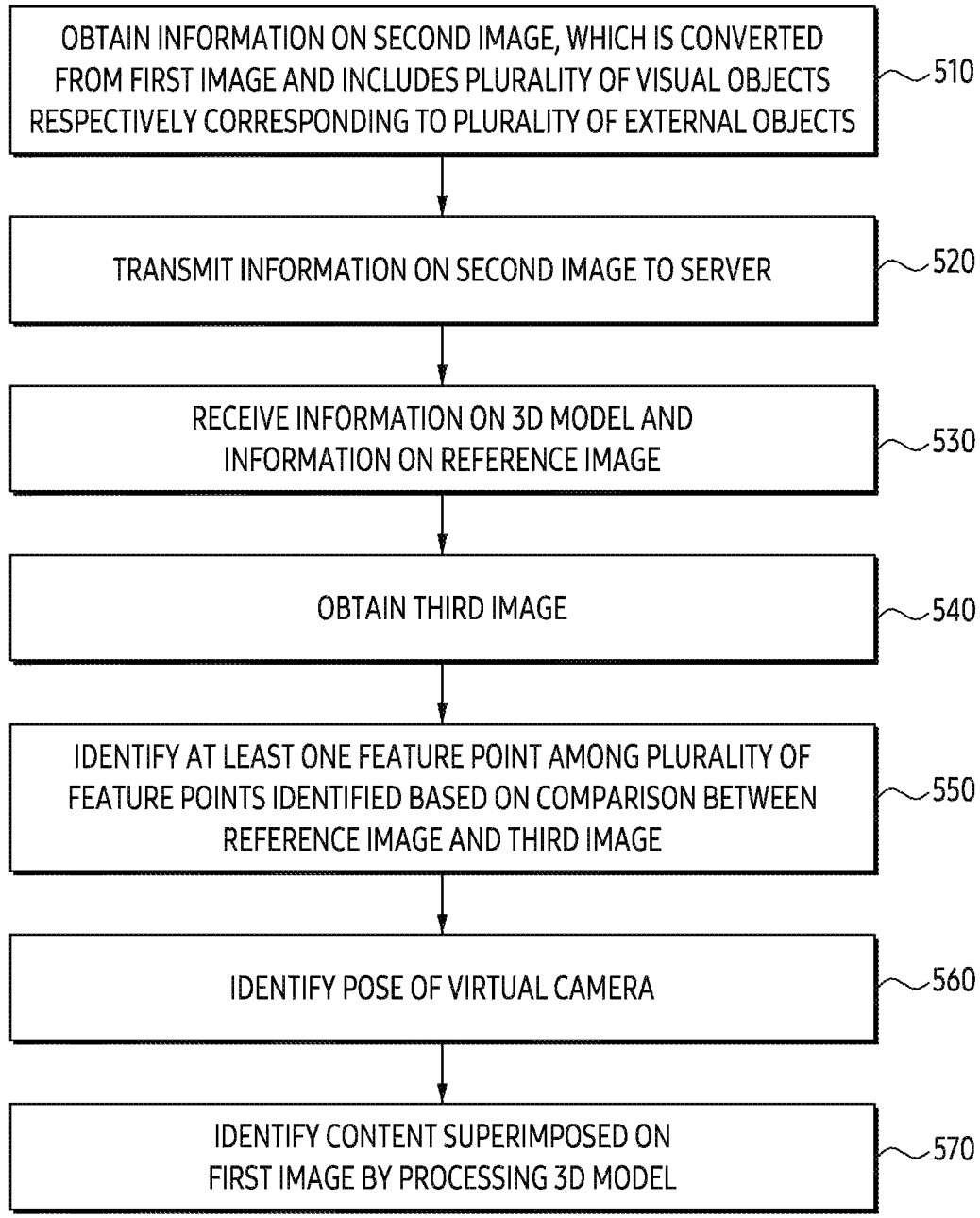
FIG. 5 is a flowchart illustrating an operation of an electronic device according to an embodiment of the disclosure.

FIG. 5 is a flowchart illustrating an operation of an electronic device according to an embodiment of the disclosure. This method may be executed by an electronic device 101 and a processor 120 of the electronic device 101 illustrated in FIGS. 2 and 3.

Referring to FIG. 5, in operation 510, the processor 120 may obtain (or identify, generate) information on a second image, which is converted from a first image and includes a plurality of visual objects respectively corresponding to a plurality of external objects.

According to an embodiment, the processor 120 may obtain the first image using a camera. The processor 120 may obtain the first image obtained by photographing (or scanning) the plurality of external objects included in an external environment using the camera.

According to an embodiment, the processor 120 may obtain (or generate) the second image. The processor 120 may obtain the second image converted from the first image. The second image may include the plurality of visual objects respectively corresponding to the plurality of external objects.

For example, the processor 120 may convert the first image obtained by photographing a plurality of external objects included in the external environment. The processor 120 may store the first image in memory of the electronic device 101. The processor 120 may obtain (or identify or generate) the second image by converting (or processing) the first image based on first semantic segmentation.

According to an embodiment, the processor 120 may obtain the second image including the plurality of visual objects respectively corresponding to the plurality of external objects by converting the first image, which is a red-green-blue (RGB) image, based on semantic segmentation. The second image may be divided into an identified area (or known area) and an unidentified area (or unknown area).

For example, the processor 120 may divide a building, a road, and a sky. The processor 120 may configure visual objects respectively corresponding to the building, the road, and the sky into the identified area. The visual objects respectively corresponding to the building, the road, and the sky may be included in the identified area. The visual objects respectively corresponding to the building, the road, and the sky may be configured in different colors, respectively.

For example, the processor 120 may configure visual objects that are not divided into one of the building, the road, and the sky into the unidentified area. The visual objects that are not divided into one of the building, the road, and the sky may be included in the unidentified area. Visual objects corresponding to a tree, a car, a person, and/or a traffic light may be configured with the same color.

According to an embodiment, the processor 120 may obtain (or identify or generate) information on the second image. For example, the information on the second image may include a binary code for the identified area.

For example, the processor 120 may convert the identified area into the binary code. The processor 120 may segment the second image into a grid having a specified size. The processor 120 may identify an average value of a color included in a plurality of grids having the specified size. The processor 120 may convert the identified area into the binary code by listing the average value of the color included in the plurality of grids.

For example, the processor 120 may convert the visual object corresponding to the building in the identified area into the binary code. The processor 120 may obtain (or identify or generate) the converted binary code.

In operation 520, the processor 120 may transmit the information on the second image to the server. For example, the processor 120 may transmit the binary code for the identified area in the second image to a server 108.

According to an embodiment, the processor 120 may transmit information on a location of the electronic device 101 obtained (or received) through a GPS receiver (e.g., a GPS receiver 340 of FIG. 3) to the server 108. For example, the processor 120 may identify the information on the location of the electronic device 101 together with the first image. The processor 120 may transmit the information on the location of the electronic device 101 to the server 108 together with the information on the second image.

In operation 530, the processor 120 may receive information on a 3D model and information on a reference image. For example, the processor 120 may receive information on a reference image identified based on information on a 3D model for a space including the plurality of external objects and the information on the second image transmitted to the server.

According to an embodiment, the information on the reference image identified based on the information on the second image may be received. For example, the reference image may be identified based on the information on the location of the electronic device 101 and the information on the second image. The server (e.g., a processor of the server) may identify a reference image that is most similar to the second image in a designated distance from the location of the electronic device 101. The server may identify the reference image that is most similar to the second image by comparing the binary code for the identified area in the second image and a binary code for a plurality of images. For example, the reference image may include the visual object for the building among the plurality of external objects.

The server may identify the information on the location of the electronic device 101 and first data on a pose of the electronic device 101 based on the reference image. For example, the first data may include data on heading of the electronic device 101. The data on the heading may include data on an angle viewed by the electronic device 101 with respect to north. For example, the first data may include data on yaw among data on roll, data on pitch, and the data on the yaw of the electronic device 101. According to an embodiment, the processor 120 may receive the first data on the pose of the electronic device 101 from the server.

According to an embodiment, the processor 120 may receive the information on the 3D model for the space including the plurality of external objects. For example, the processor 120 may receive information on a 3D model for an external environment in which the electronic device 101 is located.

For example, the server may store a 3D model obtained (or identified, generated) by processing public building information or a satellite photo. For example, the information on the 3D model may be referred to as a 3D building polygon. For example, the information on the 3D model may include information on a polygonal vertex coordinate of buildings. For example, the information on the 3D model may be used to overlay a 3D object on a screen based on the location of the electronic device 101 and the heading of the electronic device 101.

In operation 540, the processor 120 may obtain (or identify, generate) a third image. For example, the processor 120 may obtain the third image by removing at least one visual object included in the second image among the second image and the reference image among the plurality of visual objects from the second image.

According to an embodiment, the processor 120 may compare the second image and the reference image. The processor 120 may remove at least one visual object included in only the second image among a plurality of visual objects included in the second image. The processor 120 may obtain the third image by removing the at least one visual object.

In operation 550, the processor 120 may identify at least one feature point among a plurality of feature points identified based on the comparison between the reference image and the third image.

According to an embodiment, the processor 120 may compare the reference image and the third image. The processor 120 may identify the plurality of feature points based on the comparison between the reference image and the third image. For example, the processor 120 may compare the reference image and the third image through a designated algorithm. The designated algorithm may include a scale invariant feature transform (SIFT) algorithm and/or a speed-up robust features (SURP) algorithm.

In operation 560, the processor 120 may identify a pose of the virtual camera. The processor 120 may identify the pose of the virtual camera based on the at least one feature point.

For example, the processor 120 may identify the pose of the electronic device 101. The processor 120 may receive the first data on the pose of the electronic device 101 from the server. The processor 120 may identify second data on the pose of the electronic device 101 through at least one sensor. The processor 120 may identify the pose of the electronic device 101 based on the first data and the second data. The processor 120 may identify the pose of the virtual camera based on the pose of the electronic device 101. A specific example of operation 560 will be described later in FIG. 7.

In operation 570, the processor 120 may identify content superimposed on the first image by processing the 3D model. The processor 120 may identify the content superimposed on the first image by processing the 3D model based on the pose of the virtual camera. For example, the content superimposed on the first image may include an AR object (e.g., an advertisement or an emoticon). For example, the processor 120 may obtain (or generate or identify) the AR object by rendering the 3D model. The processor 120 may display an AR object that may be changed according to the pose of the electronic device 101, superimposed on the first image.

Figure 6:
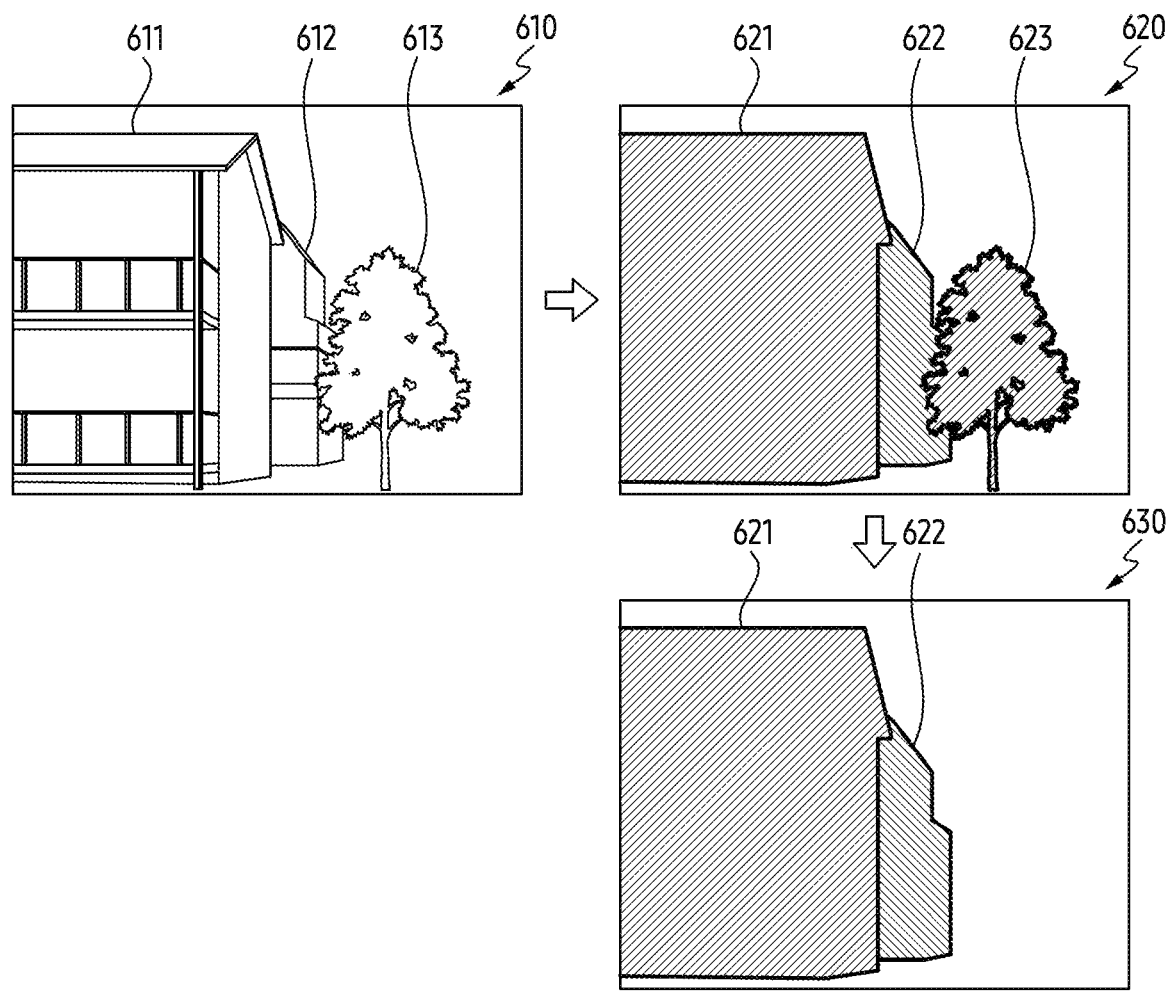
FIG. 6 illustrates an example of a first image to a third image obtained through an electronic device according to an embodiment of the disclosure.

FIG. 6 illustrates an example of a first image to a third image obtained through an electronic device according to an embodiment of the disclosure.

Referring to FIG. 6, a processor 120 may obtain (or identify or generate) a first image 610. The processor 120 may obtain the first image 610 using a camera of an electronic device 101. For example, the first image 610 may include a preview image obtained using the camera.

The first image 610 may include a plurality of objects corresponding to a plurality of external objects, respectively. For example, the first image 610 may include an object 611, an object 612, and an object 613. The object 611 and the object 612 may correspond to a building, respectively. The object 613 may correspond to a tree.

The processor 120 may convert the first image 610 into a second image 620. The processor 120 may obtain (or identify, generate) the second image 620 by converting (or processing) the first image 610 based on semantic segmentation.

According to an embodiment, by converting the first image, which is a red-green-blue (RGB) image, based on the semantic segmentation, the processor 120 may obtain a second image including a plurality of visual objects (e.g., visual objects 621, 622, 623) corresponding to the plurality of external objects, respectively. For example, the plurality of visual objects may be configured in a gray scale.

For example, the second image 620 may include the visual object 621, the visual object 622, and the visual object 623. The visual object 621 may be obtained (or identified, generated) based on the object 611. The visual object 622 may be obtained based on the object 612. The visual object 623 may be obtained based on the object 613. The processor 120 may identify that the visual object 621 and the visual object 622 correspond to the building. The processor 120 may identify that the visual object 623 corresponds to the tree. The processor 120 may set an area including the visual object 621 and the visual object 622 as an identified area. The processor 120 may set an area excluding the identified area as an unidentified area. The unidentified area may include the visual object 623.

According to an embodiment, the processor 120 may receive information on a reference image from a server. The processor 120 may obtain (or identify, generate) a third image 630 by removing at least one visual object included in the second image 620 among the second image 620 and the reference image from the second image 620.

According to an embodiment, the reference image may include visual objects included in the identified area. For example, the reference image may include only a visual object corresponding to the building. Thus, the processor 120 may obtain the third image 630 by removing at least one visual object (e.g., the visual object 623) included in the second image. The removed at least one visual object may be included in the unidentified area. The unidentified area may include the removed at least one visual object.

For example, the processor 120 may obtain the third image 630 from which the visual object 623 is removed from the second image 620. The third image 630 may include the visual object 621 and the visual object 622. The processor 120 may obtain the third image 630 from which a visual object corresponding to an external object excluding the building is removed from the second image 620. For example, the third image 630 may include only visual objects corresponding to the building (e.g., the visual object 621 and the visual object 622).

Figure 7:
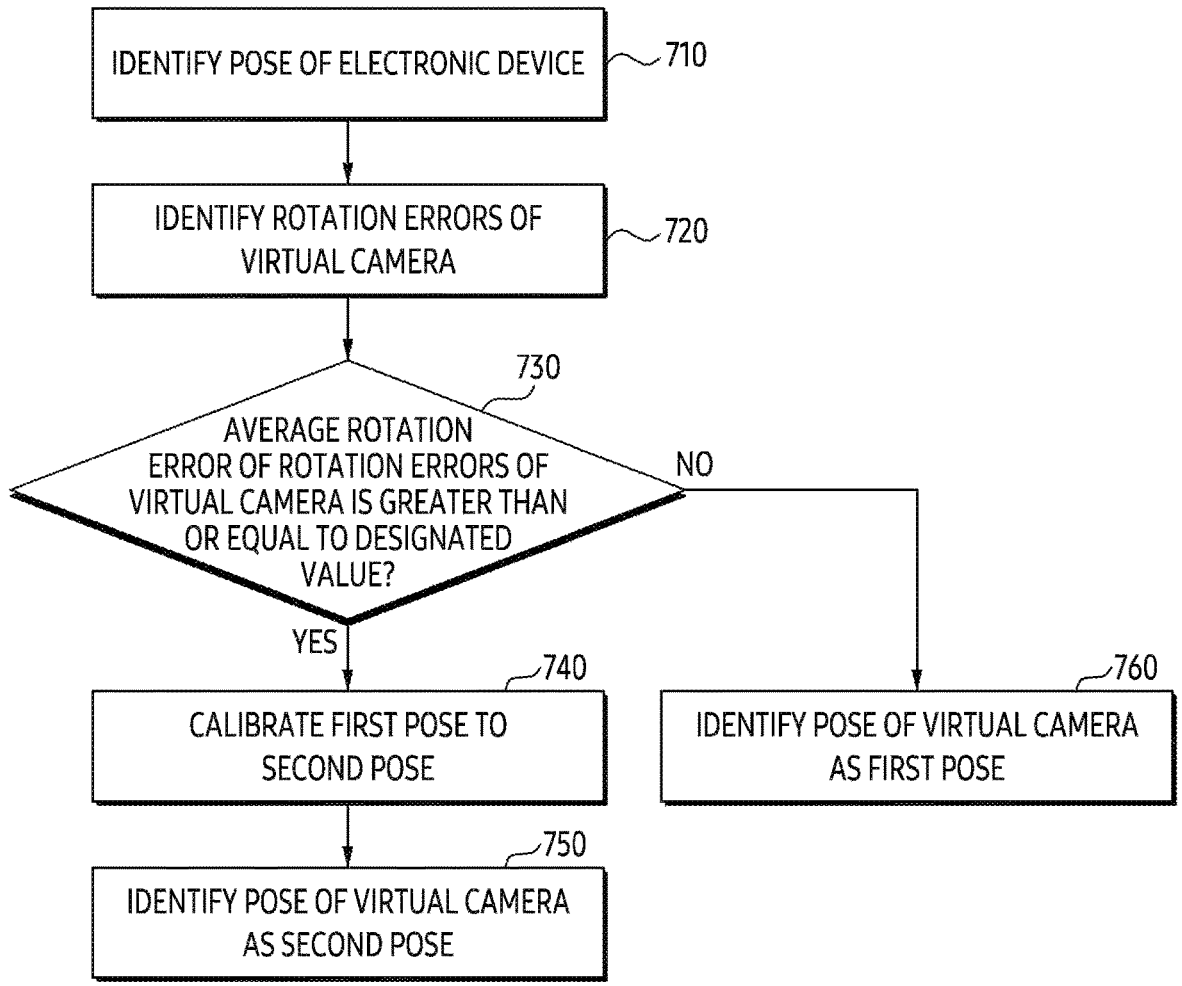
FIG. 7 is a flowchart illustrating another operation of an electronic device according to an embodiment of the disclosure.

FIG. 7 is a flowchart illustrating another operation of an electronic device according to an embodiment of the disclosure. This method may be executed by an electronic device 101 and a processor 120 of the electronic device 101 illustrated in FIGS. 2 and 3.

Referring to FIG. 7, operations 710 to 760 may correspond at least in part to operation 560 of FIG. 5. In operation 710, the processor 120 may identify a pose of the electronic device 101.

According to an embodiment, the pose of the electronic device 101 may be configured with values of roll, pitch, and yaw. The processor 120 may receive first data on the pose of the electronic device 101 from a server. The processor 120 may obtain second data on the pose of the electronic device 101 through at least one sensor. According to an embodiment, the processor 120 may obtain the second data on the pose of the electronic device 101 through an application or a software development kit (SDK) that uses the at least one sensor. For example, the processor 120 may obtain (or generate, identify) the second data on the pose of the electronic device 101 based on at least one instruction.

For example, the first data may include data on the yaw. The second data may include data on the roll and the pitch. In other words, the processor 120 may receive the data on the yaw of the electronic device 101 from the server. The processor 120 may identify the data on the roll and the data on the pitch of the electronic device 101 through the at least one sensor. The processor 120 may identify the pose of the electronic device 101 based on the data on the roll, the data on the pitch, and the data on the yaw. The processor 120 may identify a first pose of a virtual camera based on the pose of the electronic device 101. The processor 120 of the virtual camera may identify (or obtain) an image corresponding to an angle at which the electronic device 101 is facing (or viewing) through a 3D model corresponding to a specific location in three dimensions based on the first pose. The first pose of the virtual camera may be configured with the values of the roll, the pitch, and the yaw. A location of the virtual camera may correspond to a location of the electronic device 101. For example, the location of the electronic device 101 may be used as the location of the virtual camera. For another example, the location of the virtual camera may be set based on the location of the electronic device 101.

According to an embodiment, the processor 120 may identify the data on the roll, the data on the pitch, and the data on the yaw of the electronic device 101 through the at least one sensor. The processor 120 may change the data on the yaw identified through the at least one sensor, based on the data on the yaw of the electronic device 101 received from the server. An accuracy of the data (or the value of the yaw) on the yaw of the electronic device 101 received from the server may be higher than an accuracy of the data (or the value of the yaw) on the yaw identified through the at least one sensor. Therefore, the processor 120 may discard the data on the yaw identified through the at least one sensor and may use the data on the yaw of the electronic device 101 received from the server.

According to an embodiment, the pose of the electronic device 101 and the pose of the virtual camera may be distinguished. The pose of the electronic device 101 may mean a pose in an actual use environment of the electronic device 101. The pose of the virtual camera may correspond to the pose of the electronic device 101 in the 3D model. The pose of the virtual camera may mean a photographing direction of the virtual camera. The virtual camera may be used to generate (or obtain) an image corresponding to an angle viewed by the electronic device 101 existed at a specific location in a three-dimensional space. For example, the processor 120 may generate (or identify, obtain) a view (or image, video) corresponding to the pose of the virtual camera in the 3D model. For example, the pose of the electronic device 101 may be configured with the values of the roll, the pitch, and the yaw. The pose of the virtual camera may also be configured with the values of the roll, the pitch, and the yaw. According to a change in the pose of the electronic device 101, the pose of the virtual camera in the 3D model may also be changed.

In operation 720, the processor 120 may identify rotation errors of the virtual camera. For example, the processor 120 may identify the rotation errors of the virtual camera based on at least one feature point. The rotation errors of the virtual camera may include a first rotation error with respect to roll of the virtual camera, a second rotation error with respect to pitch of the virtual camera, and a third rotation error with respect to yaw of the virtual camera. The processor 120 may identify the first rotation error, the second rotation error, and the third rotation error based on the at least one feature point.

For example, the rotation errors of the virtual camera may mean a degree of distortion of a third image with respect to the reference image. An example of a specific operation of operation 720 will be described later with reference to FIG. 8.

In operation 730, the processor 120 may identify whether an average rotation error of the rotation errors of the virtual camera is greater than or equal to a designated value. For example, the processor 120 may identify an average rotation error of the first rotation error, the second rotation error, and the third rotation error of the virtual camera. The processor 120 may identify whether the average rotation error of the rotation errors of the virtual camera is greater than or equal to the designated value.

In operation 740, in case that the average rotation error is greater than or equal to the designated value, the processor 120 may calibrate the first pose identified based on the pose of the electronic device 101 to a second pose using the first rotation error, the second rotation error, and the third rotation error. In response to identifying that the average rotation error is greater than or equal to the designated value, the processor 120 may pose the first pose identified based on the pose of the electronic device 101 to the second pose using the first rotation error, the second rotation error, and the third rotation error. Based on identifying that the average rotation error is greater than or equal to the designated value, the processor 120 may identify that an error in the first pose of the virtual camera identified based on the pose of the electronic device 101 occurs largely. Thus, the processor 120 may calibrate the first pose to the second pose using the first rotation error, the second rotation error, and the third rotation error.

In operation 750, the processor 120 may identify the pose of the virtual camera as the second pose. The processor 120 may identify the pose of the virtual camera as the second pose calibrated from the first pose.

In operation 760, in case that the average rotation error is not greater than or equal to the designated value, the processor 120 may identify the pose of the virtual camera as the first pose identified based on the pose of the electronic device 101. In response to identifying that the average rotation error is not greater than or equal to the designated value, the processor 120 may identify the pose of the virtual camera as the first pose identified based on the pose of the electronic device 101. In response to identifying that the average rotation error is less than the designated value, the processor 120 may identify the pose of the virtual camera as the first pose identified based on the pose of the electronic device 101. In case that the average rotation error is less than the designated value, an error due to calibrating may occur larger. Thus, the processor 120 may identify the pose of the virtual camera as the first pose which is not calibrated.

According to an embodiment, the processor 120 may calibrate the pose of the electronic device 101 based on the pose of the virtual camera. The processor 120 may calibrate the at least one sensor based on the calibrated pose of the electronic device 101.

Figure 8:
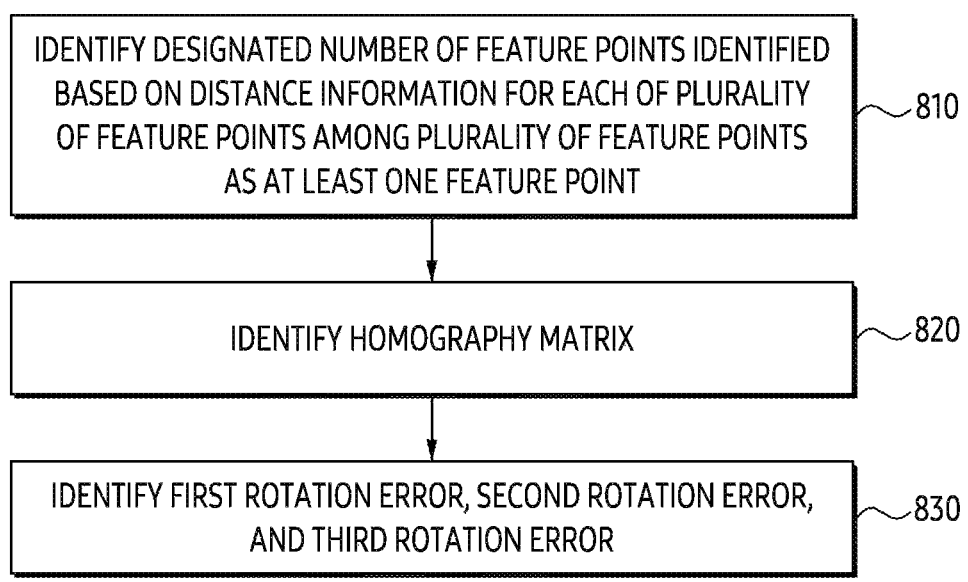
FIG. 8 is a flowchart illustrating another operation of an electronic device according to an embodiment of the disclosure.

FIG. 8 is a flowchart illustrating another operation of an electronic device according to an embodiment of the disclosure.

This method may be executed by at least one component (e.g., a processor 120) of an electronic device 101 illustrated in FIGS. 2 and 3.

Referring to FIG. 8, operations 810 to 830 may correspond at least in part to operation 720 of FIG. 7. In operation 810, the processor 120 may identify at least one feature point, which is a designated number, among a plurality of feature points. The processor 120 may identify the designated number of the at least one feature point based on distance information for each of the plurality of feature points among the plurality of feature points. The processor 120 may identify the designated number of feature points identified based on the distance information for each of the plurality of feature points among the plurality of feature points as the at least one feature point.

For example, a first feature point among the plurality of feature points may be configured with a pair of a first point (or a first pixel) in a reference image and a second point (or a second pixel) in a third image. The first feature point may be configured based on a distance between the first point and the second point. As the distance between the first point and the second point is smaller, it may indicate more similarity. The processor 120 may identify the designated number of feature points based on information on a distance for each of the plurality of feature points. The processor 120 may identify the designated number of feature points in order of the smallest distance among the plurality of feature points.

In operation 820, the processor 120 may identify a homography matrix.

For example, the homography matrix H may be configured as Equation 1.

$$H = \begin{bmatrix} h_{11} & h_{12} & h_{13} \\ h_{21} & h_{22} & h_{23} \\ h_{31} & h_{32} & h_{33} \end{bmatrix} \quad \text{Equation 1}$$

Referring to Equation 1, the homography matrix H is a matrix for indicating a relationship between a source image (e.g., the third image) and a target image (e.g., the reference image). For example, the homography matrix H is a matrix for indicating a relationship between two images (e.g., the source image and the target image) taken from different locations on the same object.

According to an embodiment, the processor 120 may obtain (or identify, generate) a third image by removing at least one visual object included in a second image among the second image and the reference image from the second image. The processor 120 may identify the homography matrix by comparing the third image from which the at least one visual object is removed and the reference image to increase an accuracy of the homography matrix.

According to an embodiment, the processor 120 may identify the homography matrix based on the at least one feature point. The homography matrix M3×4 identified based on the at least one feature point may be configured as Equation 2.

$$\lambda \begin{bmatrix} x \\ y \\ 1 \end{bmatrix} = M_{3 \times 4} \begin{bmatrix} X \\ Y \\ Z \\ 1 \end{bmatrix} \quad \text{Equation 2}$$

Referring to Equation 2, $\gamma$(lambda) is a scale.

$$\begin{bmatrix} x \\ y \\ 1 \end{bmatrix}$$

is a coordinate of a feature point of the target image (e.g., the reference image). The coordinate of the target image is represented in a pixel coordinate system. $M_{3 \times 4}$ is the homography matrix.

$$\begin{bmatrix} X \\ Y \\ Z \\ 1 \end{bmatrix}$$

is a coordinate of the source image (e.g., the third image). The coordinate of the source image is represented by a world coordinate system.

In operation 830, the processor 120 may identify a first rotation error, a second rotation error, and a third rotation error. The processor 120 may identify the first rotation error, the second rotation error, and the third rotation error based on the homography matrix and unique information on a camera.

For example, the processor 120 may identify the first rotation error with respect to roll of a virtual camera, the second rotation error with respect to pitch of the virtual camera, and the third rotation error with respect to yaw of the virtual camera, based on the at least one feature point. For example, the processor 120 may identify the homography matrix based on the at least one feature point. The processor 120 may identify the first rotation error, the second rotation error, and the third rotation error based on the homography matrix and the unique information of the camera of the electronic device 101.

For example, the processor 120 may identify the first rotation error, the second rotation error, and the third rotation error through Equation 3.

$$M_{3 \times 4} \begin{bmatrix} X \\ Y \\ Z \\ 1 \end{bmatrix} = K_{3 \times 3} [R_{3 \times 3} \quad T_{3 \times 1}] \begin{bmatrix} X \\ Y \\ Z \\ 1 \end{bmatrix} \quad \text{Equation 3}$$

Referring to Equation 3, $M_{3 \times 4}$ is the homography matrix. $R_{3 \times 3}$ is a matrix indicating rotation information. $T_{3 \times 1}$ may indicate a movement to a reference location. $K_{3 \times 3}$ is an Intrinsic matrix included in the unique information of the camera. The Intrinsic matrix included in the unique information will be described later with reference to FIGS. 9A to 9C.

According to an embodiment, the processor 120 may identify the first rotation error, the second rotation error, and the third rotation error based on the matrix indicating the rotation information. For example, the processor 120 may identify the first rotation error, the second rotation error, and the third rotation error by performing arctangent calculation on the matrix indicating the rotation information.

Figure 9A:
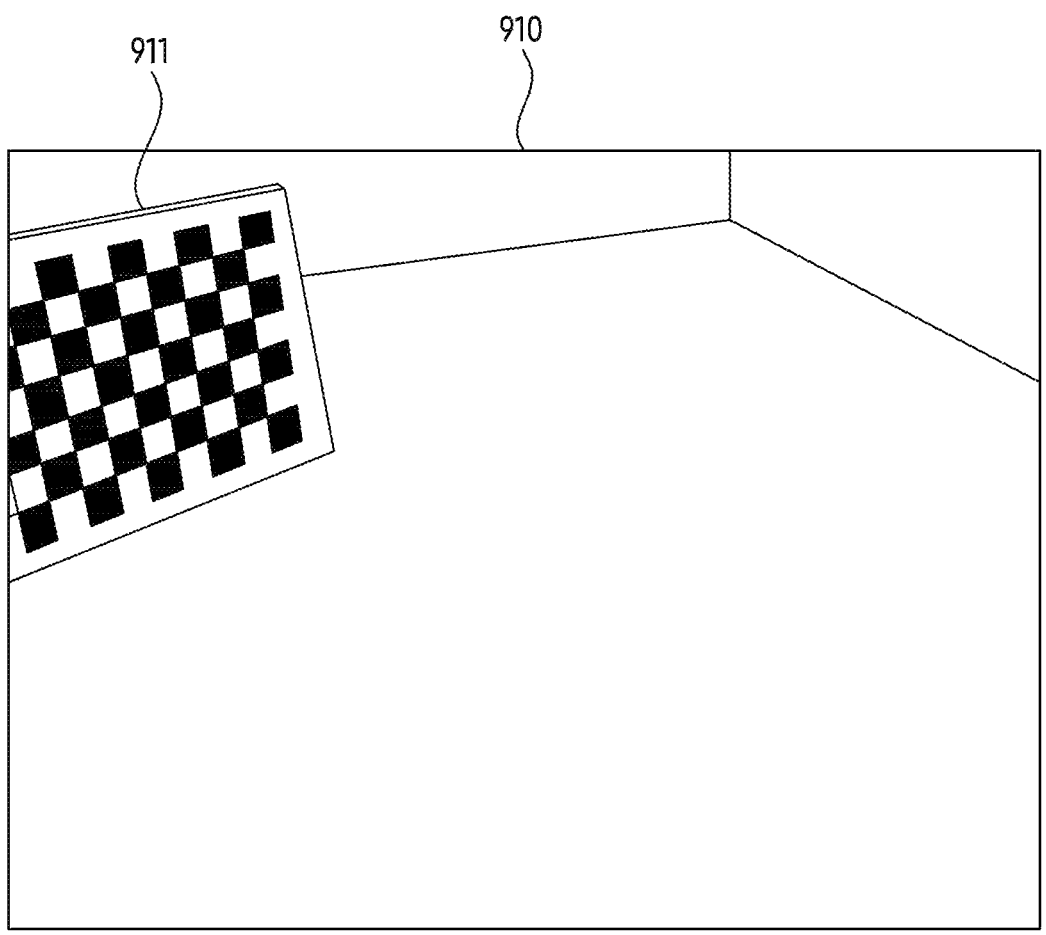
FIGS. 9A, 9B, and 9C are examples of images for identifying an Intrinsic matrix according to various embodiments of the disclosure.
Figure 9B:
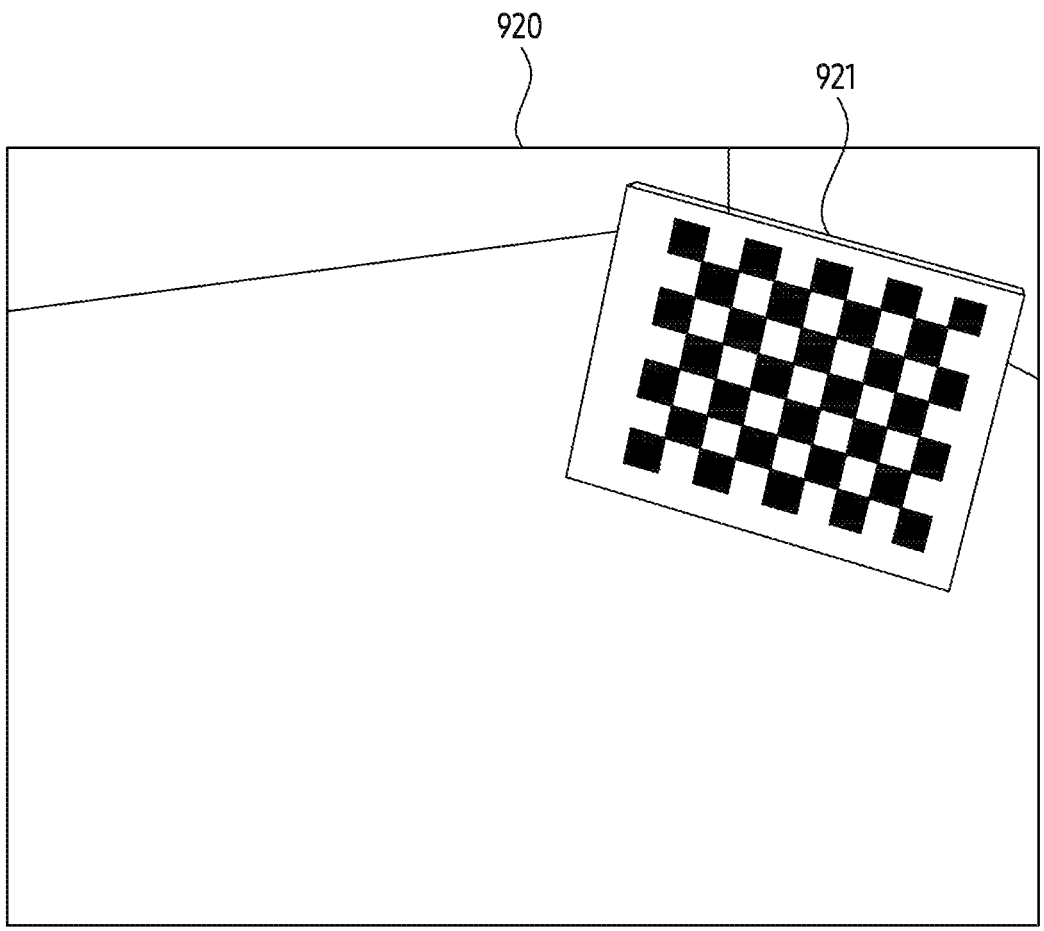
Figure 9C:
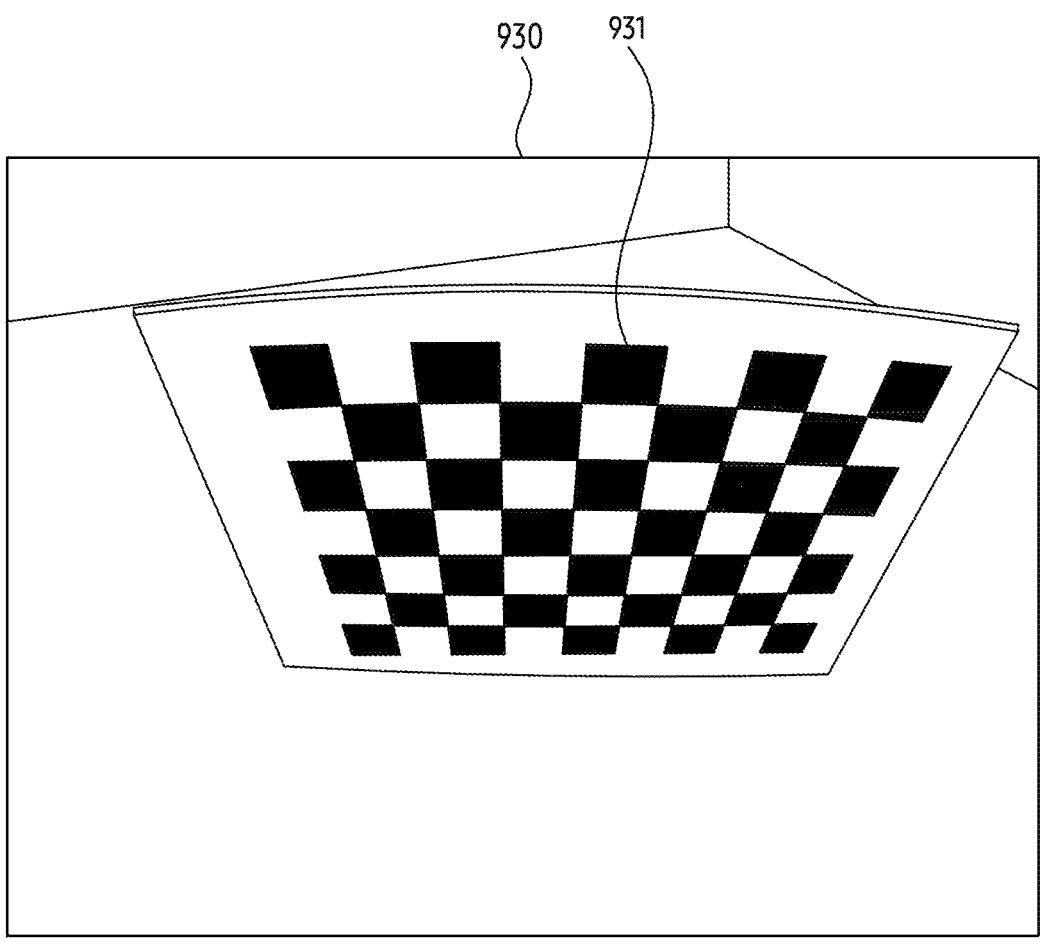

FIGS. 9A, 9B, and 9C are examples of images for identifying an Intrinsic matrix according to various embodiments of the disclosure.

Referring to FIGS. 9A to 9C, an image 910, an image 920, and an image 930 may be used to identify an Intrinsic matrix included in unique information of a camera. The image 910 may include a chessboard-shaped object 911. The image 920 may include a chessboard-shaped object 921. The image 930 may include a chessboard-shaped object 931. The image 910, the image 920, and the image 930 may each include a chessboard-shaped object (e.g., the object 911, the object 921, or the object 931) photographed at different locations. The processor 120 may perform a calibration procedure based on the chessboard-shaped objects 911, 921, and 931 photographed at various angles. The processor 120 may identify the Intrinsic matrix included in the unique information of the camera through the calibration procedure. The Intrinsic matrix $K_{3\times3}$ may be configured as Equation 4.

$$K_{3\times3} = \begin{bmatrix} f_x & 0 & C_x \\ 0 & f_y & C_y \\ 0 & 0 & 1 \end{bmatrix} \qquad \text{Equation 4}$$

Referring to Equation 4, $f_x$ and $f_y$ are focal lengths for each axis. $C_x$ is a horizontal length of the image. $C_y$ is a vertical length of the image.

Although FIGS. 9A to 9C illustrate an example in which the processor 120 identifies the Intrinsic matrix through three images, it is not limited thereto. The processor 120 may identify the Intrinsic matrix through an image including at least one chessboard-shaped object.

Figure 10:
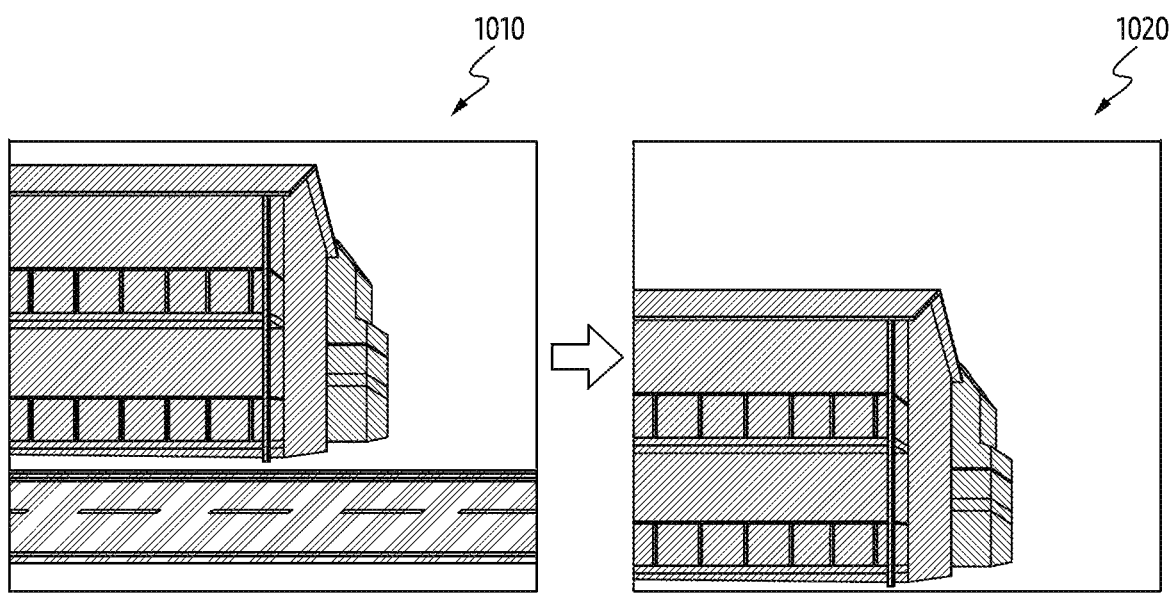
FIG. 10 illustrates an example of calibrating a rotation error according to an embodiment of the disclosure.

FIG. 10 illustrates an example of calibrating a rotation error according to an embodiment of the disclosure.

Referring to FIG. 10, a processor 120 may obtain (or identify, generate) an image 1010. The image 1010 may be an image obtained through a virtual camera before calibrating. The image 1020 may be an image obtained through the virtual camera after calibrating.

The processor 120 may identify a first rotation error with respect to roll of the virtual camera, a second rotation error with respect to pitch of the virtual camera, and a third rotation error with respect to yaw of the virtual camera. The processor 120 may identify an average rotation error of the first to third rotation errors. In response to identifying that the average rotation error is greater than or equal to a designated value, the processor 120 may calibrate a first pose identified based on a pose of an electronic device 101 to a second pose using the first rotation error, the second rotation error, and the third rotation error.

For example, the image 1010 may be an image obtained by processing a 3D model based on the first pose by the virtual camera. The processor 120 may calibrate a pose of the virtual camera from the first pose to the second pose. The processor 120 may obtain the image 1020 by processing the 3D model based on the second pose. For example, the processor 120 may calibrate data (or a value) on the yaw of the virtual camera. The processor 120 may calibrate an angle at which the virtual camera is facing in a yaw direction by calibrating the data on the yaw of the virtual camera.

According to an embodiment, the processor 120 may calibrate the pose of the electronic device 101 by calibrating the pose of the virtual camera. The processor 120 may calibrate data on roll, data on pitch, and the data on the yaw of the electronic device based on the calibrated pose of the virtual camera. By calibrating the pose of the electronic device 101, the processor 120 may calibrate the pose of the electronic device 101 obtained through the at least one sensor or a value obtained through the at least one sensor.

Figure 11:
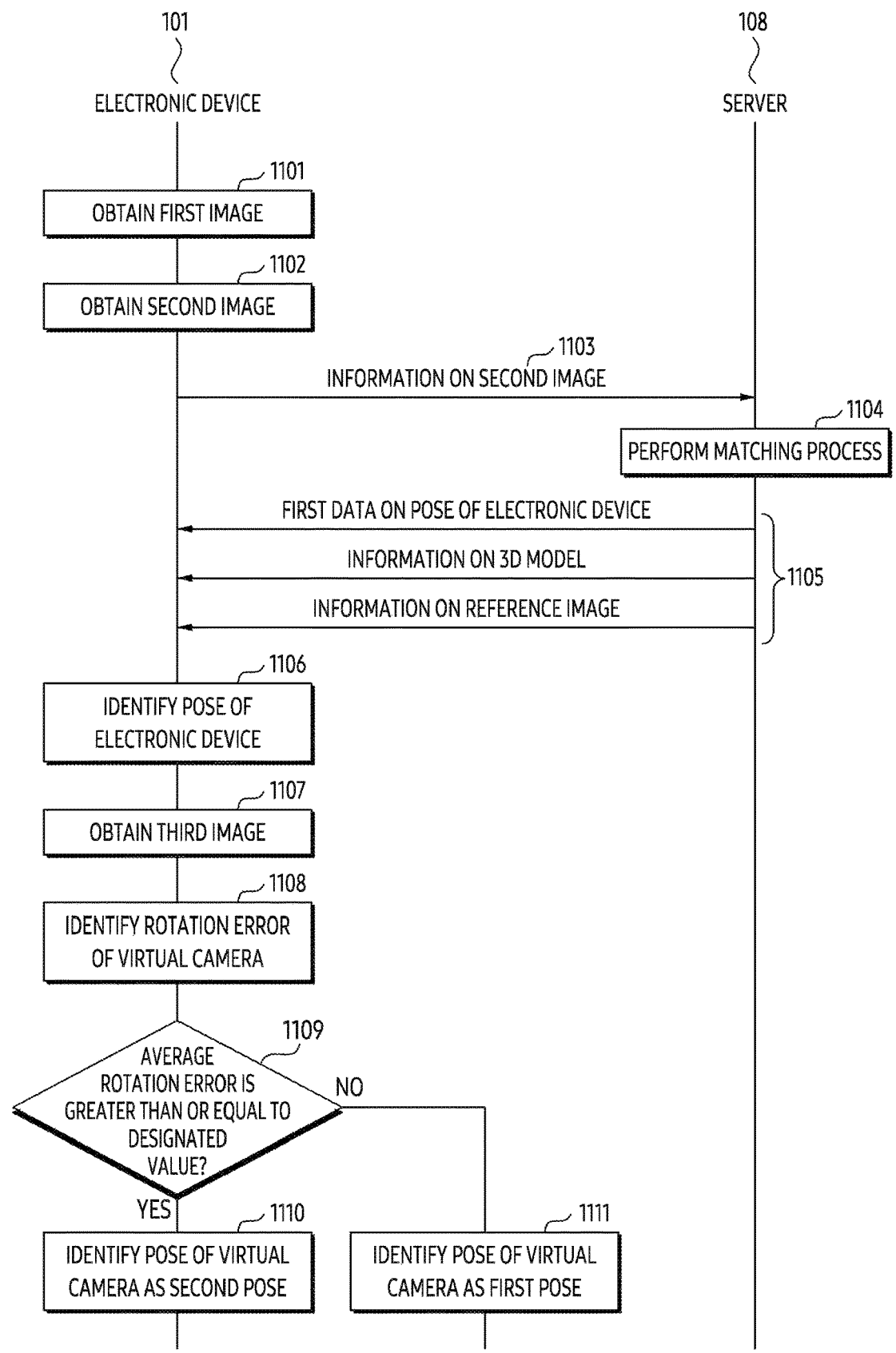
FIG. 11 illustrates a signal flowchart of an electronic device and a server according to an embodiment of the disclosure.

FIG. 11 illustrates a signal flowchart of an electronic device and a server according to an embodiment of the disclosure.

Referring to FIG. 11, in operation 1101, a processor 120 of an electronic device 101 may obtain a first image. The processor 120 may obtain the first image using a camera. The first image may include an image scanned through the camera.

In operation 1102, the processor 120 may obtain a second image. The processor 120 may obtain the second image by converting the first image. For example, the processor 120 may obtain the second image by converting the first image based on semantic segmentation.

In operation 1103, the processor 120 may transmit information on the second image to a server 108. A processor 420 of the server 108 may receive the information on the second image from the electronic device 101. For example, the information on the second image may include a binary code for an identified area of the second image.

The processor 120 may transmit information on a location (hereinafter, referred to as a first location) of the electronic device 101 obtained through a GPS receiver together with the information on the second image. The processor 420 of the server 108 may receive the information on the first location of the electronic device 101 together with the information on the second image from the electronic device 101.

In operation 1104, the processor 420 of the server 108 may perform a matching process. The processor 420 may identify a reference image most similar to the second image by comparing the binary code for the identified area of the second image and a binary code for a plurality of images stored in the server 108, in a designated distance from the first location of the electronic device 101. The processor 120 may reduce processing data and may increase processing speed by comparing the binary code for the identified area of the second image and the binary code for the plurality of images stored in the server 108. Thus, in case of comparing the binary code for the identified area of the second image and the binary code for the plurality of images stored in the server 108, an amount of computation performed by the processor 420 may be reduced.

According to an embodiment, the processor 420 may identify information on a location (hereinafter, referred to as a second location) of the electronic device 101 based on the matching process. In addition, the processor 420 may identify first data on a pose of the electronic device 101. The first data on the pose of the electronic device 101 may include data on heading of the electronic device 101.

According to an embodiment, the processor 420 may identify information on a 3D model. The processor 420 may identify information on a 3D model identified based on the second location of the electronic device 101. The processor 420 may identify information on a 3D model for a space including a plurality of external objects around the electronic device 101.

In operation 1105, the processor 420 may transmit the first data on the pose of the electronic device 101, the information on the 3D model, and information on the reference image to the electronic device 101. The processor 120 of the electronic device 101 may receive the first data on the pose of the electronic device 101, the information on the 3D model, and the information on the reference image from the server 108. According to an embodiment, the processor 420 may transmit the information on the second location of the electronic device 101 to the electronic device 101.

In operation 1105, for convenience of explanation, the first data on the pose of the electronic device 101, the information on the 3D model, and the information on the reference image are illustrated as being sequentially transmitted, but it is not limited thereto. The first data on the pose of the electronic device 101, the information on the 3D model, and the information on the reference image may be transmitted simultaneously, or a transmission order of the first data on the pose of the electronic device 101, the information on the 3D model, and the information on the reference image may be changed. According to an embodiment, at least one of the first data on the pose of the electronic device 101, the information on the 3D model, and the information on the reference image may be transmitted at a different timing from operation 1105.

In operation 1106, the processor 120 of the electronic device 101 may identify the pose of the electronic device 101. The processor 120 may identify the pose of the electronic device 101 using at least one sensor. For example, the processor 120 may identify a value for roll, a value for pitch, and a value for yaw of the electronic device 101 using the at least one sensor. The processor 120 may identify the value for the yaw of the electronic device 101 based on information on the heading of the electronic device 101 received from the server 108. The processor 120 may discard the value for the yaw identified using at least one sensor 230, and may use the value for the yaw identified based on the information on the heading of the electronic device 101.

In operation 1107, the processor 120 may obtain a third image. The processor 120 may obtain the third image by removing from the second image at least one visual object included only in the second image among the second image and the reference image among a plurality of visual objects included in the second image. For example, the processor 120 may obtain the third image by removing at least one visual object in an unidentified area (or unknown area) of the second image. As an example, the processor 120 may obtain a third image that includes only a visual object corresponding to a building.

In operation 1108, the processor 120 may identify a rotation error of a virtual camera. For example, the processor 120 may identify a designated number of feature points among a plurality of feature points, identified based on a comparison between the reference image and the third image. Based on the designated number of feature points, the processor 120 may identify the rotation error of the virtual camera. The rotation error of the virtual camera may include a first rotation error with respect to roll of the virtual camera, a second rotation error with respect to pitch of the virtual camera, and a third rotation error with respect to yaw of the virtual camera.

In operation 1109, the processor 120 may identify whether an average rotation error of the first rotation error to the third rotation error is greater than or equal to a designated value.

In operation 1110, the processor 120 may identify a pose of the virtual camera as a second pose based on identifying that the average rotation error is greater than or equal to the designated value. For example, the processor 120 may identify a first pose based on the pose of the electronic device 101 identified in operation 1106. The processor 120 may calibrate (or change) the first pose to the second pose using the first rotation error to the third rotation error. The processor 120 may identify the pose of the virtual camera as the second pose calibrated from the first pose.

In operation 1111, the processor 120 may identify the pose of the virtual camera as the first pose based on identifying that the average rotation error is not greater than or equal to the designated value. The processor 120 may identify the pose of the virtual camera as the first pose based on identifying that the average rotation error is less than the designated value. The processor 120 may identify the pose of the virtual camera as the first pose identified based on the pose of the electronic device 101 identified in operation 1106.

Although not illustrated, after operations 1110 and 1111 are performed, the processor 120 may identify content superimposed on the first image by processing the 3D model based on the identified pose of the virtual camera. The processor 120 may improve an accuracy of a location of the content superimposed on the first image or an accuracy of a shape of the content by calibrating the rotation error (e.g., the first rotation error to the third rotation error).

According to various embodiments, an electronic device may comprise a camera, a communication circuit, and at least one processor operably coupled to the camera and the communication circuit. The at least one processor may be configured to obtain information on a second image comprising a plurality of visual objects corresponding to a plurality of external objects respectively and changed from a first image obtained using the camera. The at least one processor may be configured to transmit, to a server, the information on the second image. The at least one processor may be configured to receive information on a three-dimensional (3D) model for a space comprising the plurality of external objects and information on a reference image identified based on the information on the second image transmitted to the server. In response to receiving the information on the reference image, the at least one processor may be configured to obtain a third image by removing, from the second image, at least one visual object comprised in the second image of the second image and the reference image, among the plurality of visual objects. The at least one processor may be configured to identify at least one feature point among a plurality of feature points identified based on comparison between the reference image and the third image. The at least one processor may be configured to identify, based on the at least one feature point, a pose of a virtual camera. The at least one processor may be configured to identify a content superimposed on the first image by processing 3D model based on the pose of the virtual camera.

According to an embodiment, the electronic device may further comprise a global positioning system (GPS) receiver, and wherein the at least one processor may be configured to identify location of the electronic device using the GPS receiver. The at least one processor may be configured to transmit, to the server, information on the location of the electronic device with the information on the second image. The reference image may be identified based on the information on the location of the electronic device and the information on the second image.

According to an embodiment, the second image may be obtained by being changed from the first image based on semantic segmentation. The second image may be divided to an identified area and an unidentified area. The unidentified area may comprise the at least one visual object. The information on the second image may comprise a binary code with respect to the identified area.

According to an embodiment, the pose of the virtual camera may comprise a value of roll, a value of pitch, and a value of yaw of the virtual camera.

According to an embodiment, the at least one processor may be configured to identify designated number of feature points identified based on distance information for each of the identified plurality of feature points, among the identified plurality of feature points as the at least one feature point.

According to an embodiment, the at least one processor may be configured to identify, based on the at least one feature point, a first rotation error with respect to the roll of the virtual camera, a second rotation error with respect to the pitch of the virtual camera, and a third rotation error with respect to the yaw of the virtual camera.

According to an embodiment, the at least one processor may be configured to identify, based on the at least one feature point, a homography matrix. The at least one processor may be configured to identify, based on the homography matrix and unique information on the camera, the first rotation error, the second rotation error, and the third rotation error.

According to an embodiment, the electronic device may further comprise at least one sensor. The at least one processor may be further configured to identify a pose of the electronic device based on first data related to the pose of the electronic device received from the server and second data related to the pose of the electronic device obtained through the at least one sensor.

According to an embodiment, the at least one processor may be configured to identify an average rotation error of the first rotation error, the second rotation error, and the third rotation error. In response to identifying that the average rotation error is less than a designated value, The at least one processor may be configured to identify the pose of the virtual camera with a first pose identified based on the pose of the electronic device.

According to an embodiment, the at least one processor may be configured to identify an average rotation error of the first rotation error, the second rotation error, and the third rotation error. In response to identifying that the average rotation error is greater than or equal to a designated value, the at least one processor may be configured to calibrate a first pose identified based on the pose of the electronic device to a second pose using the first rotation error, the second rotation error, and the third rotation error, and identify the pose of the virtual camera with the second pose.

According to various embodiments, a method of an electronic device may comprise obtaining information on a second image comprising a plurality of visual objects corresponding to a plurality of external objects respectively and changed from a first image obtained using a camera. The method may comprise transmitting, to a server, the information on the second image, and receiving information on a three-dimensional (3D) model for a space comprising the plurality of external objects and information on a reference image identified based on the information on the second image transmitted to the server. In response to receiving the information on the reference image, the method may comprise obtaining a third image by removing, from the second image, at least one visual object comprised in the second image of the second image and the reference image, among the plurality of visual objects. The method may comprise identifying at least one feature point among a plurality of feature points identified based on comparison between the reference image and the third image. The method may comprise identifying, based on the at least one feature point, a pose of a virtual camera. The method may comprise identifying a content superimposed on the first image by processing 3D model based on the pose of the virtual camera.

According to an embodiment, the method may comprise identifying location of the electronic device using a global positioning system (GPS) receiver. The method may comprise transmitting, to the server, information on the location of the electronic device with the information on the second image. The reference image may be set based on the information on the location of the electronic device and the information on the second image.

According to an embodiment, the second image may be obtained by being changed from the first image based on semantic segmentation. The second image may be divided to an identified area and an unidentified area. The unidentified area may comprise the at least one visual object. The information on the second image may comprise a binary code with respect to the identified area.

According to an embodiment, the pose of the virtual camera may comprise a value of roll, a value of pitch, and a value of yaw of the virtual camera.

According to an embodiment, identifying the at least one feature point among the plurality of feature points identified based on comparison between the reference image and the third image may comprise identifying designated number of feature points identified based on distance information for each of the identified plurality of feature points, among the identified plurality of feature points as the at least one feature point.

According to an embodiment, identifying the pose of the virtual camera based on the at least one feature point may comprise identifying, based on the at least one feature point, a first rotation error with respect to the roll of the virtual camera, a second rotation error with respect to the pitch of the virtual camera, and a third rotation error with respect to the yaw of the virtual camera.

According to an embodiment, identifying the first rotation error, the second rotation error, and the third rotation error may comprise identifying, based on the at least one feature point, a homography matrix, and identifying, based on the homography matrix and unique information on the camera, the first rotation error, the second rotation error, and the third rotation error.

According to an embodiment, the method may comprise identifying a pose of the electronic device based on first data related to the pose of the electronic device received from the server and second data related to the pose of the electronic device obtained through the at least one sensor.

According to an embodiment, identifying the pose of the virtual camera based on the at least one feature point may comprise identifying an average rotation error of the first rotation error, the second rotation error, and the third rotation error, in response to identifying that the average rotation error is greater than or equal to a designated value, calibrating a first pose identified based on the pose of the electronic device to a second pose using the first rotation error, the second rotation error, and the third rotation error, and identifying the pose of the virtual camera with the second pose.

According to various embodiments, non-transitory computer readable storage medium may store one or more programs, when being executed by a processor of an electronic device with a camera and a communication circuit, comprising instructions causing the electronic device to obtain information on a second image comprising a plurality of visual objects corresponding to a plurality of external objects respectively and changed from a first image obtained using the camera. The non-transitory computer readable storage medium may store the one or more programs, when being executed by the processor of the electronic device, comprising instructions causing the electronic device to transmit, to a server, the information on the second image, and comprising instructions causing the electronic device to receive information on a three-dimensional (3D) model for a space comprising the plurality of external objects and information on a reference image identified based on the information on the second image transmitted to the server. In response to receiving the information on the reference image, the non-transitory computer readable storage medium may store, when being executed by the processor of the electronic device, one or more programs comprising instructions causing the electronic device to obtain a third image by removing, from the second image, at least one visual object comprised in the second image of the second image and the reference image, among the plurality of visual objects. The non-transitory computer readable storage medium may store, when being executed by the processor of the electronic device, one or more programs comprising instructions causing the electronic device to identify at least one feature point among a plurality of feature points identified based on comparison between the reference image and the third image. The non-transitory computer readable storage medium may store, when being executed by the processor of the electronic device, one or more programs comprising instructions causing the electronic device to identify, based on the at least one feature point, a pose of a virtual camera. The non-transitory computer readable storage medium may store, when being executed by the processor of the electronic device, one or more programs comprising instructions causing the electronic device to identify a content superimposed on the first image by processing 3D model based on the pose of the virtual camera.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. As used herein, each of such phrases as "A or B," "at least one of A and B," "at least one of A or B," "A, B, or C," "at least one of A, B, and C," and "at least one of A, B, or C," may include any one of or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," or "connected with" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between a case in which data is semi-permanently stored in the storage medium and a case in which the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

It will be appreciated that various embodiments of the disclosure according to the claims and description in the specification can be realized in the form of hardware, software or a combination of hardware and software.

Any such software may be stored in non-transitory computer readable storage media. The non-transitory computer readable storage media store one or more computer programs (software modules), the one or more computer programs include computer-executable instructions that, when executed by one or more processors of an electronic device, cause the electronic device to perform a method of the disclosure.

Any such software may be stored in the form of volatile or non-volatile storage such as, for example, a storage device like read only memory (ROM), whether erasable or rewritable or not, or in the form of memory such as, for example, random access memory (RAM), memory chips, device or integrated circuits or on an optically or magnetically readable medium such as, for example, a compact disk (CD), digital versatile disc (DVD), magnetic disk or magnetic tape or the like. It will be appreciated that the storage devices and storage media are various embodiments of non-transitory machine-readable storage that are suitable for storing a computer program or computer programs comprising instructions that, when executed, implement various embodiments of the disclosure. Accordingly, various embodiments provide a program comprising code for implementing apparatus or a method as claimed in any one of the claims of this specification and a non-transitory machine-readable storage storing such a program.

While the disclosure has been shown and described with reference to various embodiments thereof, it will be understood by those skilled in the art that various changes in form and details may be made therein without departing from the spirit and scope of the disclosure as defined by the appended claims and their equivalents.

No claim element is to be construed under the provisions of 35 U.S.C. § 112, sixth paragraph, unless the element is expressly recited using the phrase "means for" or "means".

What is claimed is:

1. An electronic device comprising:
   a camera;
   a communication circuit;
   one or more processors; and
   memory storing instructions that, when executed by the one or more processors, cause the electronic device to:
   obtain information on a second image comprising a plurality of visual objects corresponding to a plurality of external objects respectively and changed from a first image obtained using the camera,
   transmit, to a server, the information on the second image,
   receive information on a three-dimensional (3D) model for a space comprising the plurality of external objects and information on a reference image identified based on the information on the second image transmitted to the server,
   in response to receiving the information on the reference image, obtain a third image by removing, from the second image, at least one visual object comprised in the second image of the second image and the reference image, among the plurality of visual objects,
   identify at least one feature point among a plurality of feature points identified based on a comparison between the reference image and the third image,
   identify, based on the at least one feature point, a pose of a virtual camera, and
   identify a content superimposed on the first image by processing 3D model based on the pose of the virtual camera.

2. The electronic device of claim 1, further comprising:
   a global positioning system (GPS) receiver,
   wherein the instructions, when executed by the one or more processors, cause the electronic device to:
   identify a location of the electronic device using the GPS receiver, and
   transmit, to the server, information on the location of the electronic device with the information on the second image, and
   wherein the reference image is identified based on the information on the location of the electronic device and the information on the second image.

3. The electronic device of claim 1,
   wherein the second image is obtained by being changed from the first image based on semantic segmentation,
   wherein the second image is divided to an identified area and an unidentified area,
   wherein the unidentified area comprises the at least one visual object, and
   wherein the information on the second image comprises a binary code with respect to the identified area.

4. The electronic device of claim 1, wherein the pose of the virtual camera comprises a value of roll, a value of pitch, and a value of yaw of the virtual camera.

5. The electronic device of claim 1, wherein the instructions, when executed by the one or more processors, cause the electronic device to:
   identify designated number of feature points identified based on distance information for each of the identified plurality of feature points, among the identified plurality of feature points as the at least one feature point.

6. The electronic device of claim 5, wherein the instructions, when executed by the one or more processors, cause the electronic device to identify, based on the at least one feature point, a first rotation error with respect to a roll of the virtual camera, a second rotation error with respect to a pitch of the virtual camera, and a third rotation error with respect to a yaw of the virtual camera.

7. The electronic device of claim 6, wherein the instructions, when executed by the one or more processors, cause the electronic device to:
   identify, based on the at least one feature point, a homography matrix, and
   identify, based on the homography matrix and unique information on the camera, the first rotation error, the second rotation error, and the third rotation error.

8. The electronic device of claim 7, further comprising:
   at least one sensor,
   wherein the instructions, when executed by the one or more processors, cause the electronic device to identify a pose of the electronic device based on first data related to the pose of the electronic device received from the server and second data related to the pose of the electronic device obtained through the at least one sensor.

9. The electronic device of claim 8, wherein the instructions, when executed by the one or more processors, cause the electronic device to:

identify an average rotation error of the first rotation error, the second rotation error, and the third rotation error, and in response to identifying that the average rotation error is less than a designated value, identify the pose of the virtual camera with a first pose identified based on the pose of the electronic device.

10. The electronic device of claim 8, wherein the instructions, when executed by the one or more processors, cause the electronic device to:

identify an average rotation error of the first rotation error, the second rotation error, and the third rotation error, in response to identifying that the average rotation error is greater than or equal to a designated value, calibrate a first pose identified based on the pose of the electronic device to a second pose using the first rotation error, the second rotation error, and the third rotation error, and identify the pose of the virtual camera with the second pose.

11. A method of an electronic device, the method comprising:

obtaining information on a second image comprising a plurality of visual objects corresponding to a plurality of external objects respectively and changed from a first image obtained using a camera;

transmitting, to a server, the information on the second image;

receiving information on a three-dimensional (3D) model for a space comprising the plurality of external objects and information on a reference image identified based on the information on the second image transmitted to the server;

in response to receiving the information on the reference image, obtaining a third image by removing, from the second image, at least one visual object comprised in the second image of the second image and the reference image, among the plurality of visual objects;

identifying at least one feature point among a plurality of feature points identified based on a comparison between the reference image and the third image;

identifying, based on the at least one feature point, a pose of a virtual camera; and identifying a content superimposed on the first image by processing 3D model based on the pose of the virtual camera.

12. The method of claim 11, further comprising:

identifying location of the electronic device using a global positioning system (GPS) receiver, and transmitting, to the server, information on the location of the electronic device with the information on the second image, wherein the reference image is set based on the information on the location of the electronic device and the information on the second image.

13. The method of claim 11, wherein the second image is obtained by being changed from the first image based on semantic segmentation, wherein the second image is divided to an identified area and an unidentified area, wherein the unidentified area comprises the at least one visual object, and wherein the information on the second image comprises a binary code with respect to the identified area.

14. The method of claim 11, wherein the pose of the virtual camera comprises a value of roll, a value of pitch, and a value of yaw of the virtual camera.

15. The method of claim 11, further comprising:

identifying designated number of feature points identified based on distance information for each of the identified plurality of feature points, among the identified plurality of feature points as the at least one feature point.

16. The method of claim 15, further comprising:

identifying, based on the at least one feature point, a first rotation error with respect to a roll of the virtual camera, a second rotation error with respect to a pitch of the virtual camera, and a third rotation error with respect to a yaw of the virtual camera.

17. The method of claim 16, further comprising:

identifying, based on the at least one feature point, a homography matrix, and identifying, based on the homography matrix and unique information on the camera, the first rotation error, the second rotation error, and the third rotation error.

18. The method of claim 17, further comprising:

identifying a pose of the electronic device based on first data related to the pose of the electronic device received from the server and second data related to the pose of the electronic device obtained through the at least one sensor.

19. One or more non-transitory computer readable storage media storing one or more programs including computer-executable instructions that, when being executed by one or more processors of an electronic device including a camera and a communication circuit, cause the electronic device to perform operations, the operations comprising:

obtaining information on a second image comprising a plurality of visual objects corresponding to a plurality of external objects respectively and changed from a first image obtained using the camera, transmitting, to a server, the information on the second image, receiving information on a three-dimensional (3D) model for a space comprising the plurality of external objects and information on a reference image identified based on the information on the second image transmitted to the server, in response to receiving the information on the reference image, obtaining a third image by removing, from the second image, at least one visual object comprised in the second image of the second image and the reference image, among the plurality of visual objects, identifying at least one feature point among a plurality of feature points identified based on a comparison between the reference image and the third image, identifying, based on the at least one feature point, a pose of a virtual camera, and identifying a content superimposed on the first image by processing a 3D model based on the pose of the virtual camera.

20. The one or more non-transitory computer-readable storage media of claim 19, the operations further comprising:

identifying location of the electronic device using a global positioning system (GPS) receiver, and transmitting, to the server, information on the location of the electronic device with the information on the second image, wherein the reference image is set based on the information on the location of the electronic device and the information on the second image.

* * * * *